United States Patent
Whitten et al.

(10) Patent No.: US 9,156,620 B2
(45) Date of Patent: Oct. 13, 2015

(54) CONVEYOR BELT AND PLATFORM FOR CONVEYOR BELT

(71) Applicant: Illinois Tool Works Inc., Glenview, IL (US)

(72) Inventors: Joey D. Whitten, Candler, NC (US); Jack F. Stone, Cross Hill, SC (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/204,525

(22) Filed: Mar. 11, 2014

(65) Prior Publication Data

US 2014/0262698 A1 Sep. 18, 2014

Related U.S. Application Data

(60) Provisional application No. 61/783,869, filed on Mar. 14, 2013.

(51) Int. Cl.
| | |
|---|---|
| *B65G 17/08* | (2006.01) |
| *B65G 17/34* | (2006.01) |
| *B65G 17/44* | (2006.01) |
| *B65G 17/06* | (2006.01) |
| *B65G 17/46* | (2006.01) |
| *B65G 17/38* | (2006.01) |

(52) U.S. Cl.
CPC ............ *B65G 17/08* (2013.01); *B65G 17/066* (2013.01); *B65G 17/086* (2013.01); *B65G 17/34* (2013.01); *B65G 17/44* (2013.01); *B65G 17/46* (2013.01); *B65G 17/385* (2013.01)

(58) Field of Classification Search
CPC ...... B65G 17/18; B65G 17/086; B65G 17/46; B65G 17/44; B65G 17/34; B65G 17/066; B65G 17/068; B65G 17/385; B65G 17/10
USPC .......................... 198/699.1, 844, 849, 850–853
See application file for complete search history.

(56) References Cited

U.S. PATENT DOCUMENTS

| | | | | |
|---|---|---|---|---|
| 4,754,872 A | * | 7/1988 | Damkjaer ..................... 198/852 |
| 5,697,492 A | * | 12/1997 | Damkj.ae butted.r ........ 198/852 |
| 5,909,797 A | * | 6/1999 | Van Den Goor ......... 198/370.02 |
| 6,209,716 B1 | | 4/2001 | Bogle |
| 6,237,750 B1 | * | 5/2001 | Damkjaer et al. ............ 198/778 |
| 6,601,697 B2 | | 8/2003 | Steeber et al. |
| 6,811,021 B1 | * | 11/2004 | Corley ....................... 198/690.2 |

(Continued)

FOREIGN PATENT DOCUMENTS

| | | |
|---|---|---|
| DE | 10 2006 008 123 | 8/2007 |
| WO | WO 2014/018544 A1 | 1/2014 |

OTHER PUBLICATIONS

Citation of Related Applications.

(Continued)

*Primary Examiner* — Mark A Deuble
(74) *Attorney, Agent, or Firm* — Thomas, Karceski & Karmilovich, PC

(57) ABSTRACT

A surface platform for a conveyor belt includes a platform member having an upper surface and a rail member at one side of the upper surface. One end of the rail member has an undercut portion defining an extension, and the other end of the rail member defines a slot, the slot and extension being complimentarily sized. The slot has a bottom edge located above the upper surface of the platform member.

8 Claims, 10 Drawing Sheets

(56) References Cited

U.S. PATENT DOCUMENTS

| | | |
|---|---|---|
| 7,032,810 B2 | 4/2006 | Benedetti et al. |
| 7,500,555 B1* | 3/2009 | Liao .......................... 198/844.1 |
| 2003/0136647 A1* | 7/2003 | Knott et al. .................. 198/831 |
| 2004/0011627 A1* | 1/2004 | Palmaer et al. ............... 198/778 |
| 2006/0079364 A1* | 4/2006 | Skljarow et al. ............. 474/206 |
| 2006/0118395 A1* | 6/2006 | Stebnicki et al. ............ 198/852 |
| 2009/0200136 A1* | 8/2009 | Giehrl et al. ............. 198/341.01 |
| 2014/0021020 A1* | 1/2014 | Bogle et al. ................... 198/778 |
| 2014/0305775 A1* | 10/2014 | Beesley ........................ 198/850 |

OTHER PUBLICATIONS

International Search Report for Application No. PCT/US2014/024213 dated Jul. 21, 2004.

* cited by examiner

CONVEYOR BELT AND PLATFORM FOR CONVEYOR BELT

RELATED APPLICATIONS

This application claims filing benefit of U.S. Provisional Patent Application Ser. No. 61/783,869 having a filing date of Mar. 14, 2013, which is incorporated herein by reference in its entirety.

TECHNICAL FIELD

This present disclosure relates generally to the field of conveyor belts. More particularly, the disclosure relates to conveyor belts with removable tops.

BACKGROUND

Conveying systems are well known in the art and have any number of useful applications, such as the transportation of objects in various stages of manufacturing, storage, and shipping. Typical conveying systems utilize a flat conveying belt, generally formed of interconnected links, driven by motors that engage with the conveyor belt. Such conveying systems are commonly employed in the transportation of manufactured goods and articles. With these typical systems, the motor drives a toothed drive sprocket that engages with complimenting driving recesses or "dogs" formed on the conveyor belt.

Link type conveyor belts are sometimes designed in a knuckle/socket joint arrangement wherein one end of the link is a rounded knuckle and the opposite end is a socket formed by two extending edges. The knuckle of one link fits into the socket of a neighboring link. The knuckle is able to move in various directions within the socket, which allows for the conveyor system as a whole to curve and move.

The interconnected links typically have a platform member connected to or formed at the link's upper surface. The platform member is generally shaped to match the neighboring platform members on other links such that the links can turn while moving around curved sections of the conveying system, yet are also shaped such that the cracks and spaces formed between the links are minimized. The platform members can be connected to the links in several different ways. For instance, the platforms may have pegs extending therefrom which match corresponding slots on the links. Alternatively or additionally, the platforms can have snap springs which lock into place on corresponding sections of the links. Such a knuckle link with a snap-on platform surface member is disclosed in U.S. Pat. No. 6,209,716.

The platform surface member on the conveyor links of that patent has a substantially flat upper surface with no substantially vertical end walls. Such structure works well for most conveyances. U.S. Pat. No. 6,601,697 discloses an alternate platform with vertical walls in the form of a rail member. Such end walls can be useful in preventing articles from shifting laterally, especially due to tangential or centrifugal forces when going around bends and/or travelling non-horizontally.

SUMMARY

According to certain aspects of the disclosure, a conveyor belt includes an interconnected series of relatively pivotable body members and a plurality of platform members. Each platform member is attached to a respective one of the body members. Each platform member has an upper surface, a first side, and a rail member extending substantially upward from the upper surface near the first side. A first end of the rail member includes a slot, and a second end of the rail member including an extension. The slots and extensions of the platform members are complimentarily sized so that each extension of a platform member fits at least partially within the slot of an adjacent platform member on an adjacent body member, and so that each extension of a platform member of on a given body member is located so as to extend the guide surface of the platform member on the given body member substantially to the guide surface of the platform member of the adjacent body member even when the adjacent body members pivot apart at an end adjacent the rail members. Various options and modifications are possible.

According to certain other aspects of the disclosure, a surface platform for a conveyor belt includes a platform member having an upper surface and a rail member at one side of the upper surface. One end of the rail member has an undercut portion defining an extension, and the other end of the rail member defines a slot, the slot and extension being complimentarily sized. The slot has a bottom edge located above the upper surface of the platform member. Again, various options and modifications are possible.

DETAILED DESCRIPTION

Figure 1:
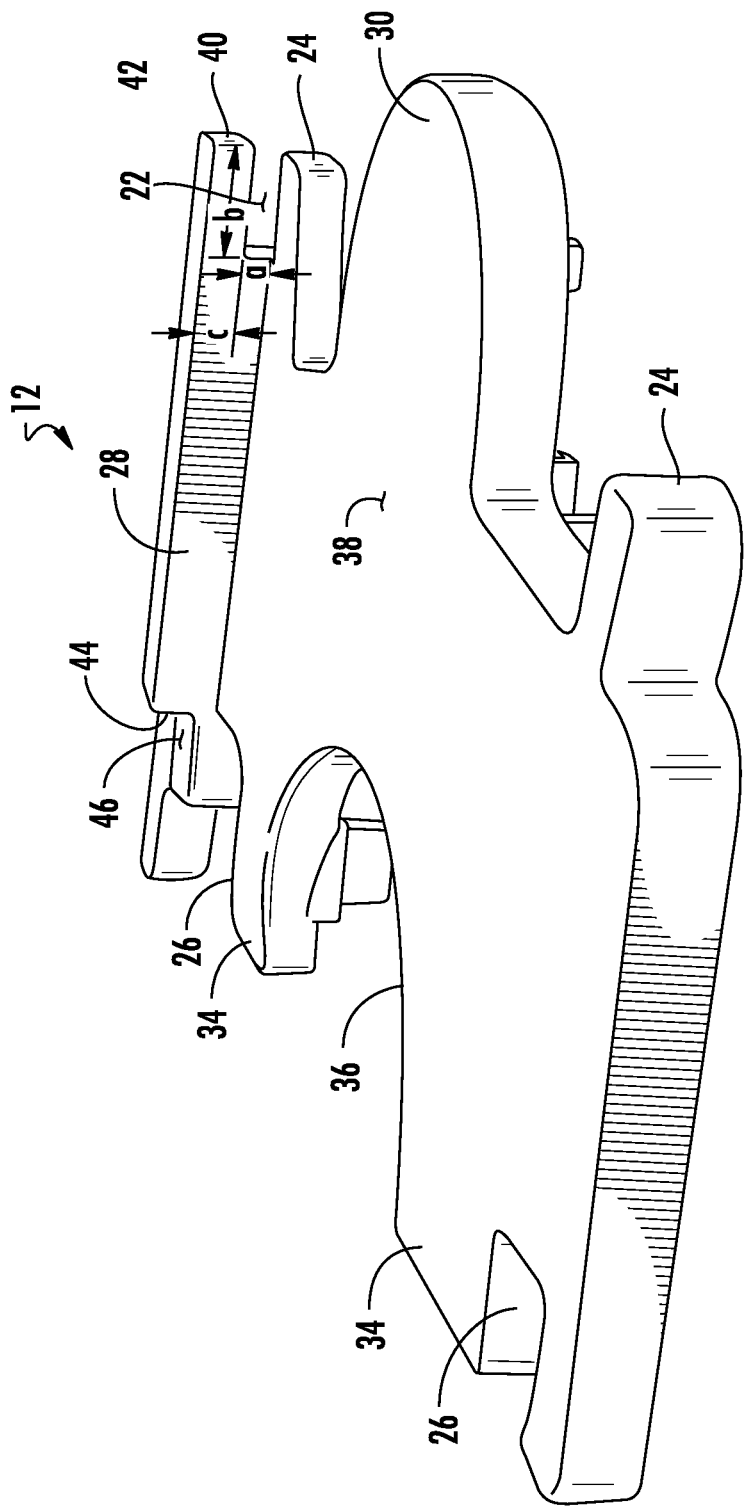
FIG. 1 is a perspective view of one surface platform for a conveyor according to certain aspects of the disclosure.
Figure 2:
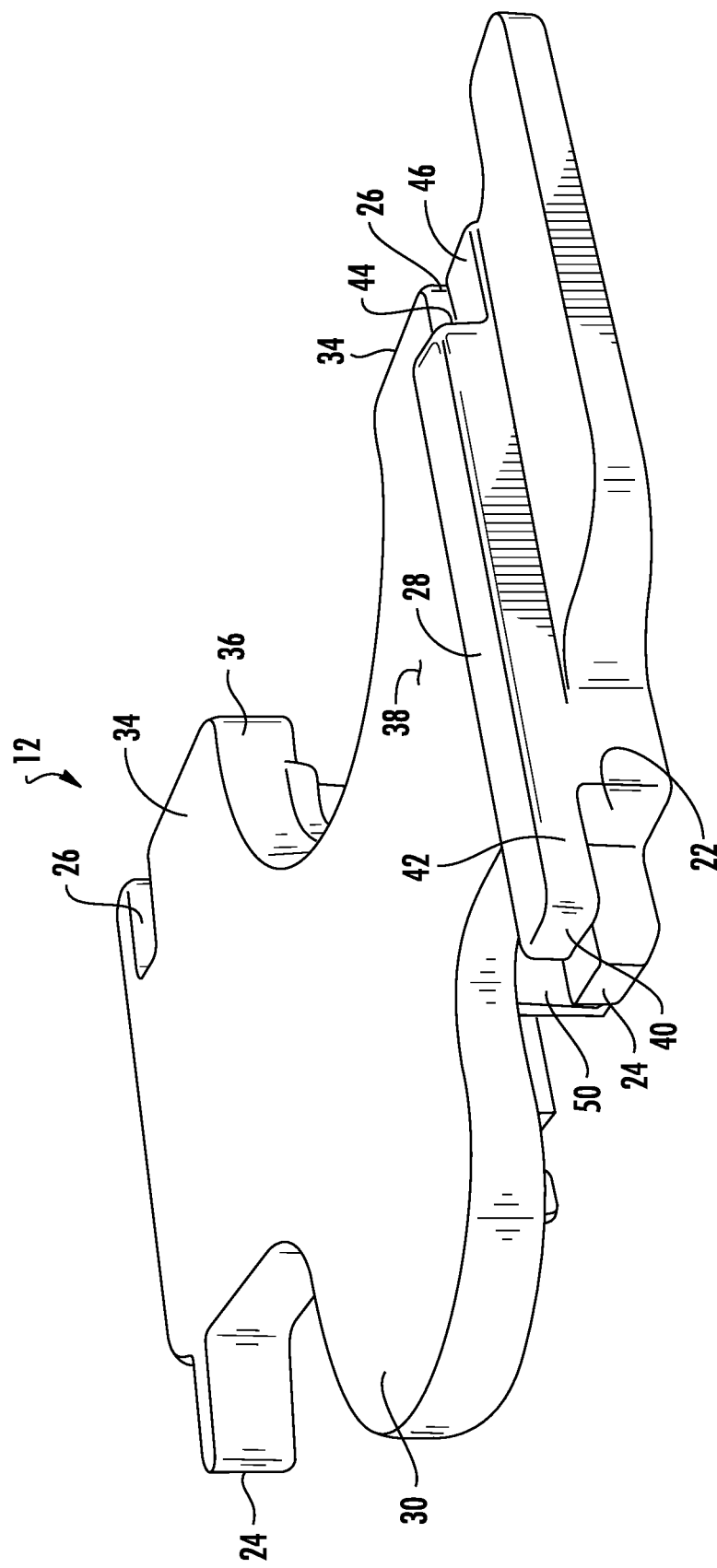
FIG. 2 is an alternate perspective view of the surface platform of FIG. 1.
Figure 3:
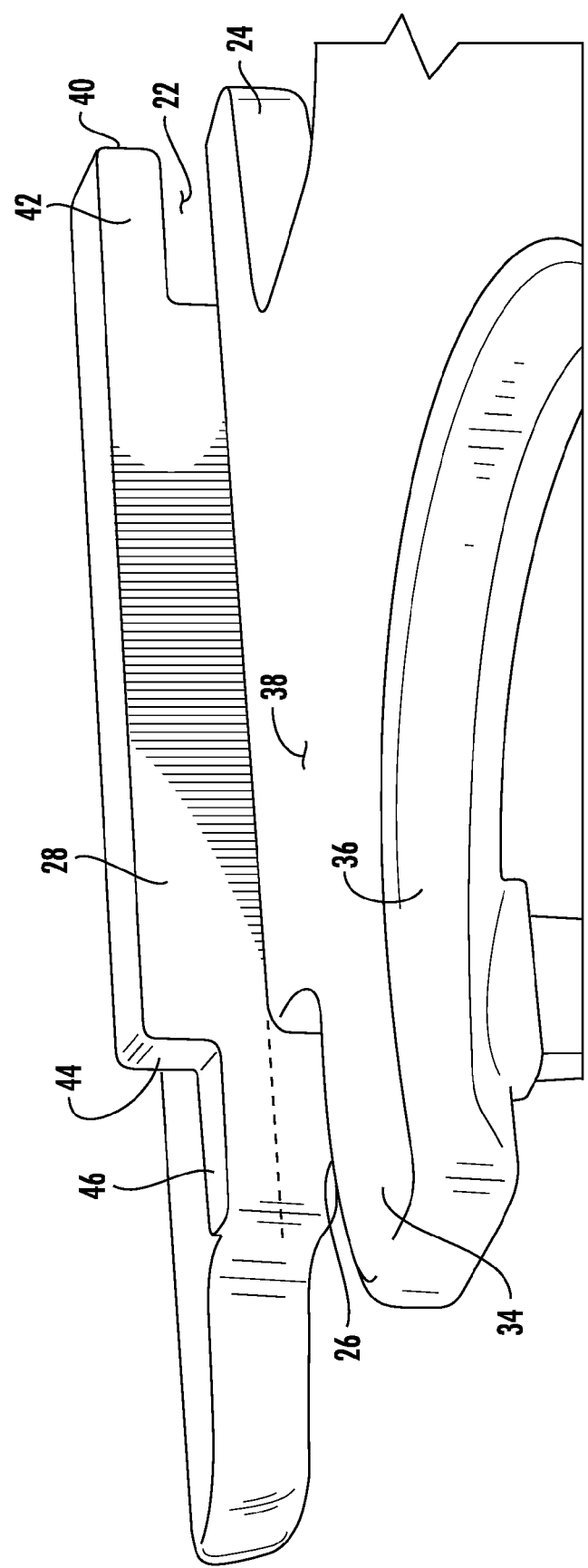
FIG. 3 is a close-up perspective view of the surface platform of FIG. 1.
Figure 4:
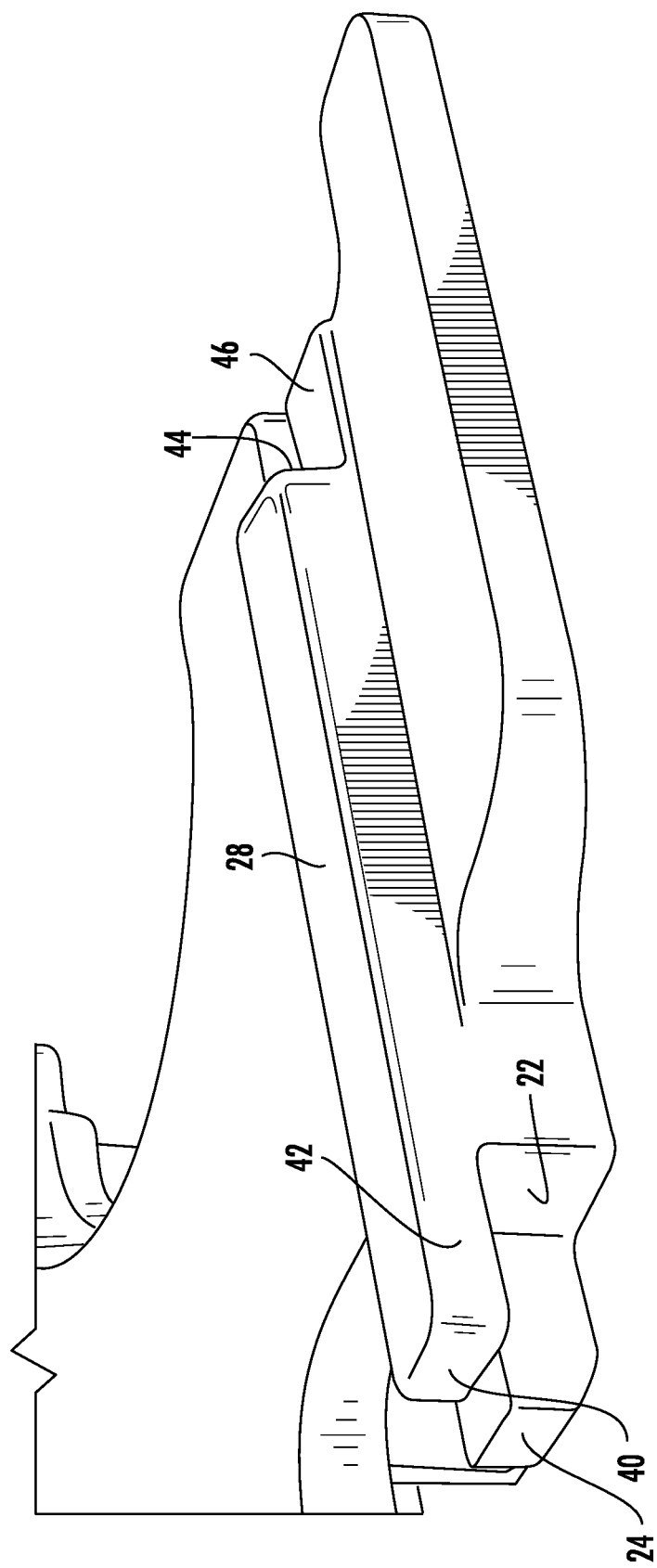
FIG. 4 is an alternate close-up perspective view as in FIG. 2.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 10:
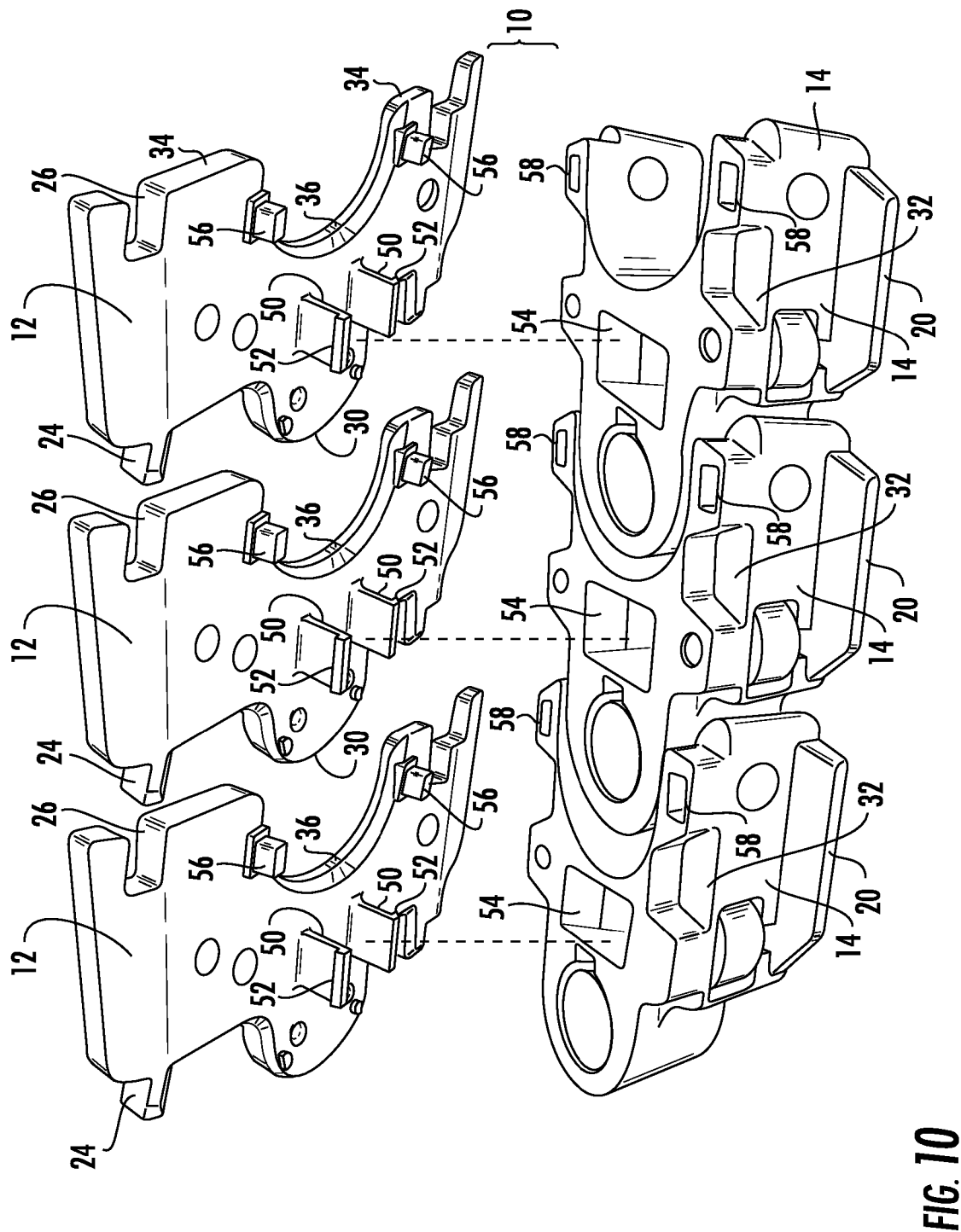
FIG. 10 an exploded perspective view of a number of surface platforms and a conveyor as in FIG. 5.

Referring to the drawings, FIGS. 1-10 show one example of a conveyor belt having body members with detachable surface platform members in accordance with the present disclosure. FIG. 10 shows a portion of such conveyor 10 including three surface platform members 12 and three interconnected body members 14. Body members 14 are similar to the knuckle drive links shown in U.S. Pat. No. 6,209,716, discussed above. However, it should be clear that body members 14 could have many forms according to the present disclosure.

One surface platform member 12 is attachable to the upper side of each body member 14. As can be seen in FIG. 10, the perimeter shape of each surface platform member 12 may be substantially the same as that of the corresponding knuckle drive link body member 14. This correspondence allows the platform members and body members to move generally together maintaining a consistent conveying surface the as conveyor 10 moves through a conveying path, in particular around bends. Surface platform members 12 may accordingly be shaped such that the leading edge of one surface platform member 12 is configured to be nested within and accepted by a trailing edge of the next surface platform member 12. For instance, leading fingers 24 of one surface platform member 12 are configured to be adapted into trailing grooves 26 of the next surface platform member 12. Additionally, a nose portion 30 of one surface platform member 12 is adapted to fit within a void 36 of an adjacent surface platform member 12.

Articles are placed on top of surface platform members 12 and are conveyed as the plurality of body members 14 move along a supporting structure (not shown). The body members 14 are fitted with flanges 20 on either end in order to ride the supporting structure. Drive indentations 32, sometimes known as "drive dogs", are provided between the flanges 20 and the surface members 12. A drive wheel (not shown) engages drive indentations 32 and propels conveyor belt 10 along the supporting structure.

A set of bifurcated legs 34 on surface platform members 12 form void 36 into which nose portion 30 of an adjacent surface platform member 12 can mate. Conveyor belt 10 may curve along a curved section of supporting structure 16 due to the loosely mated nose portion 30 and void 36. Also, the loose mating connection between the leading fingers 24 and the trailing grooves 26 allows for substantial conveyor belt 10 curvature while not allowing gaps too large to cause issues with conveyed items on the platforms. Providing such spacing thus allows for a substantially continuous transport surface along the length of the conveyor belt 10. The configuration of surface platform members 12 with nose portion 30 and leading fingers 24 results in a surface that does not have a sharp dividing line running laterally across. Such a surface is advantageous because a sharp dividing line may serve as a greater impediment to movement of articles longitudinally upon conveyor belt 10, as is potentially undesirable. However, the present disclosure may be modified in order to produce a series of surface platform members 12 having a sharp dividing line running laterally across if it is desirable for a specific application.

The surface platform members 12 are provided with a substantially vertical rail member 28 along one side. One end of rail member 28 has an undercut portion 22 having a height a above the platform top 38 and a depth b from the forward edge 40 of the rail member. Above undercut portion 22, rail member 28 extension 42 has a height c. The opposite end of rail member 28 has a slot 44 sized with a height just large enough to receive extension 42 (i.e., about height c or greater). A bottom edge 46 of slot 44 is located above platform top 38. In other words, slot 44 is sized to receive extension 42 when two adjacent platform members are attached to body members 14.

Figure 5:
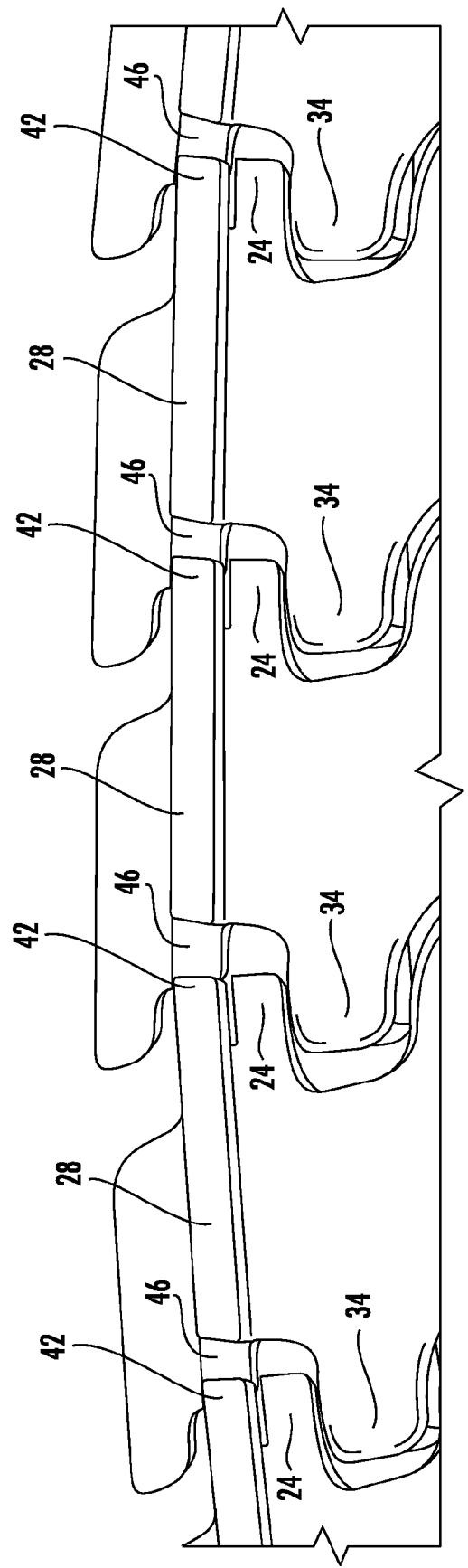
FIG. 5 is a perspective view of a number of surface platforms as in FIG. 1, as installed on a conveyor.
Figure 6:
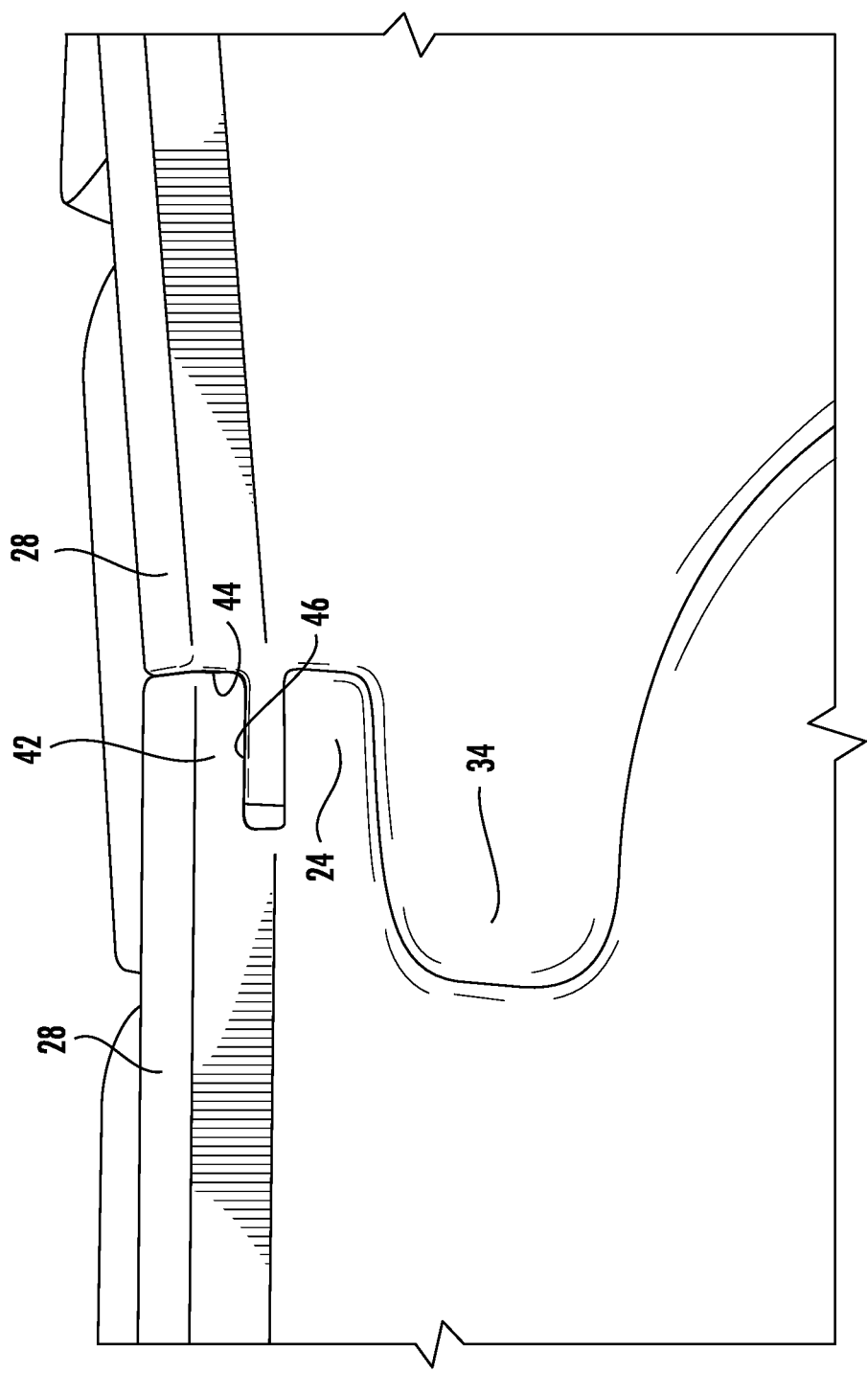
FIG. 6 is a close-up perspective view of the surface platforms of FIG. 5 in a first position.
Figure 7:
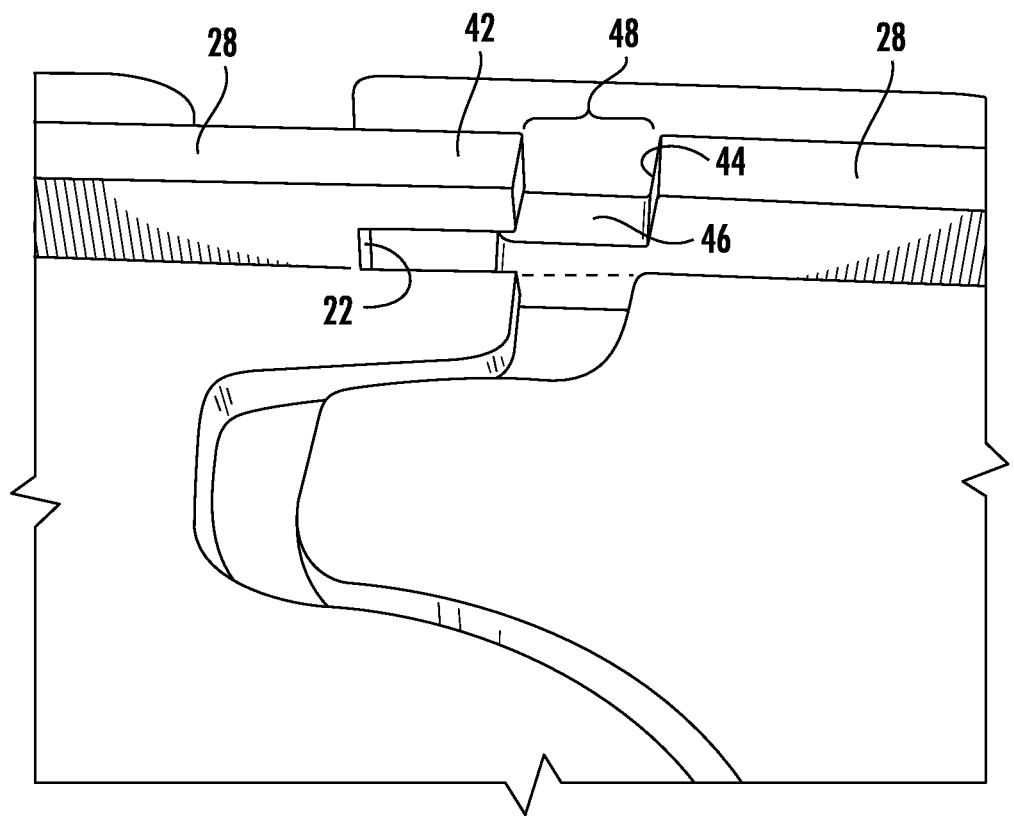
FIG. 7 is a close-up perspective view of the surface platforms of FIG. 5 in a second position.
Figure 8:
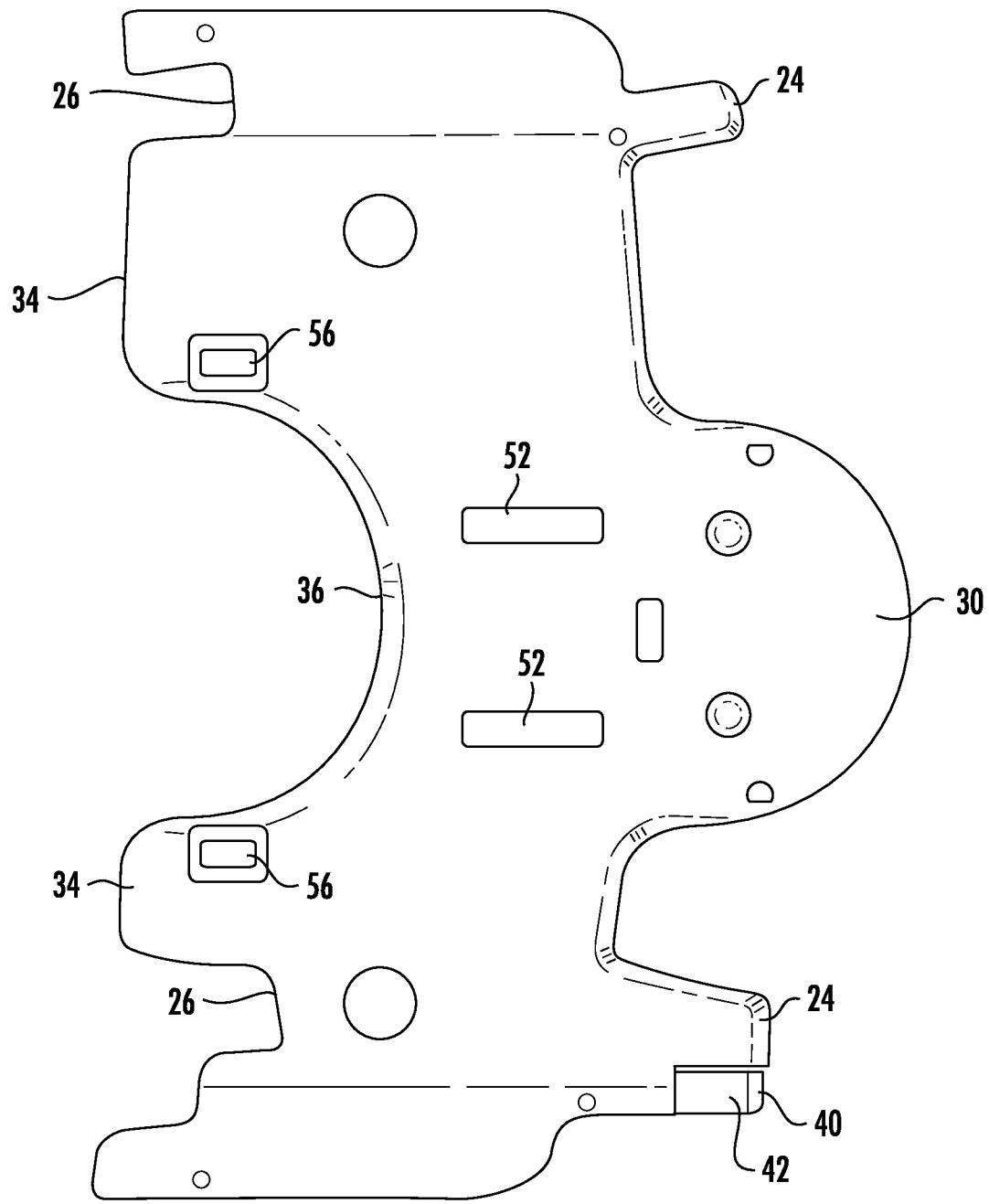
FIG. 8 is a bottom view of a surface platform as in FIG. 1.
Figure 9:
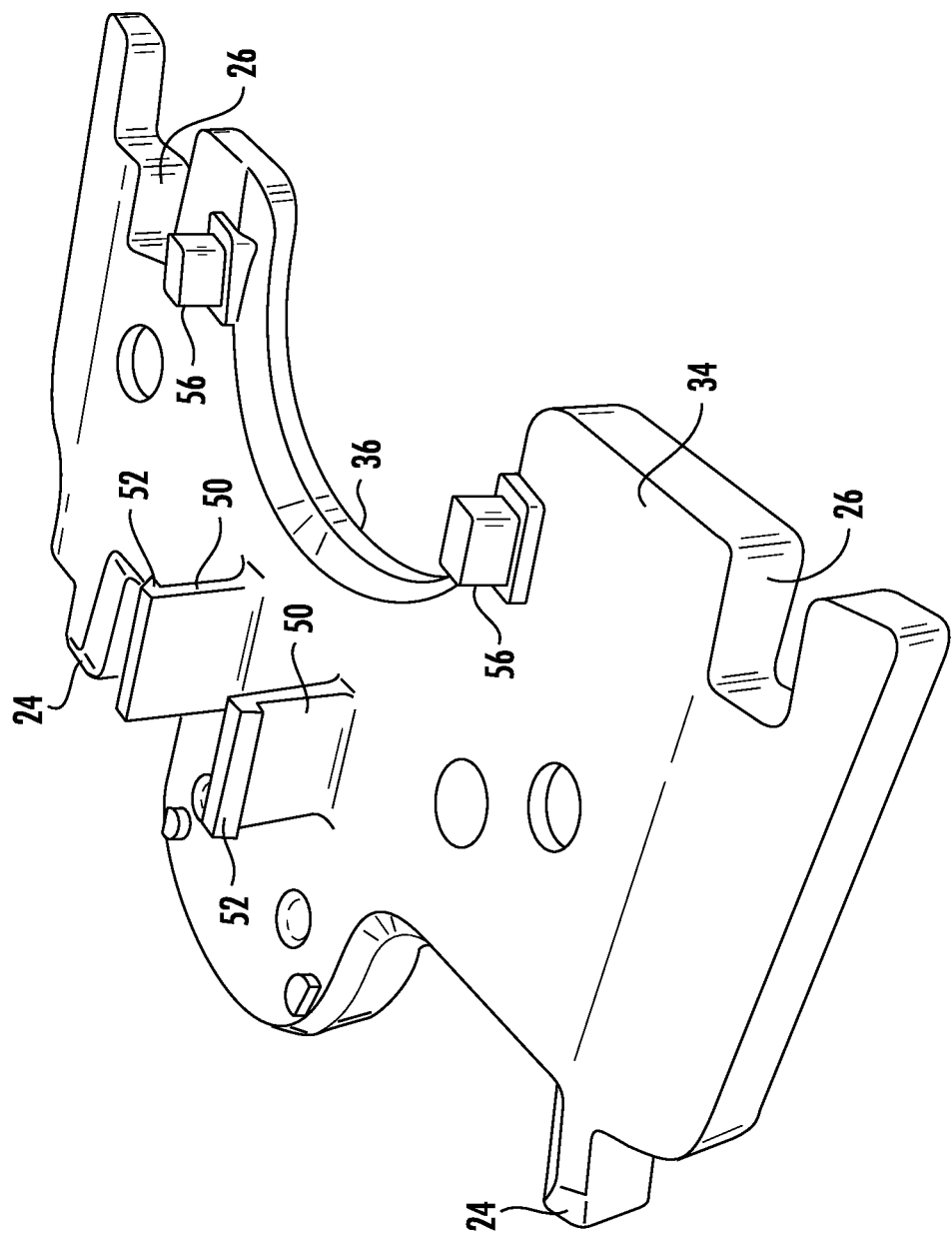
FIG. 9 is a bottom perspective view of a surface platform as in FIG. 1.

The slot 44 and extension 42 allow adjacent platform members to pivot with body members 14 as conveyor travels around a rightward or leftward bend, while still maintaining a substantially continuous rail. FIG. 5 shows a turn to the right and FIG. 6 shows a turn to the left. In both configurations, there is no gap between adjacent platform members along the rail edge due to the overlap between the extensions 42 and slots 44. Because the bottom edge 46 of each slot 44 is located above the platform surface 38, at least some wall exists along the conveyor in any rightward turn. FIG. 6 shows a closeup view of two surface platforms at the mating area between extension 42 and slot 44 in a leftward turn. It can be imagined that without the undercut 22 and slot 44, ends of rail members 28 would simply extend downward vertically. In the orientation of FIG. 6, such structure would not present a problem as to rail continuity. However, one could imagine that a gap would exist in the orientation of FIG. 7 in area 48, were it not for the portion of rail member 28 below bottom edge 46 that extends above surface 38. Accordingly, the present disclosure provides a structure that maintains at least some wall structure formed by different portions of rail members 28 at an outside of a turn. Such wall structure forms a substantially continuous guide surface for items, and can be especially important if articles being conveyed are items such as boxes with corners. Such continuous structure prevents corners or other portions of conveyed items from entering or being interfered with by such gaps by preventing or substantially eliminating such gaps.

Platform members 12 may have attachment and alignment structure of various types. For example, spring tabs 50 with locking members 52 may be provided to mate with openings 54 on body members 14. Also, alignment extensions 56 may also be provided to mate with structure such as edges or openings 68. Thus, platform members 12 and body members 14 may be ready assembled and disassembled for service, conveyed item change out, or cleaning.

It should be understood that the invention includes various modifications that can be made to the embodiments of the conveyor belt described as come within the scope of the appended claims and their equivalents.

We claim:

1. A conveyor belt for conveying articles comprising:
   an interconnected series of relatively pivotable body members; and
   a plurality of platform members, each platform member releasably attachable to a respective one of the body members, each platform member having an upper surface configured to contact and support conveyed articles, a first side, a second side, and a rail member extending substantially upward from the upper surface near the first side and defining a guide surface facing the second side, a first end of the rail member including a slot, a second end of the rail member including an undercut portion defining an extension, the slots and extensions of the platform members being complimentarily sized so that each extension of a platform member fits at least partially within the slot of an adjacent platform member on an adjacent body member, and so that each extension of a platform member of on a given body member is located so as to extend the guide surface of the platform member on the given body member substantially to the guide surface of the platform member of the adjacent body member even when the adjacent body members pivot apart at an end adjacent the rail members.

2. The conveyor belt of claim 1, wherein each rail member has a height, and each slot has a height about one-half of the height of the rail member.

3. The conveyor belt of claim 1, wherein each rail member has a height, and each extension has a height about one-half of the height of the rail member.

4. The conveyor belt of claim 1, wherein each platform member upper surface has an extending finger and a groove, the fingers and grooves of the platform members being complimentarily sized so that each finger of a platform member on a given link body fits at least partially within the groove of a platform member on an adjacent link body when the given and adjacent link bodies are in the linear condition.

5. A surface platform for a conveyor belt including body members for conveying articles comprising:

a platform member having an upper surface configured to contact and support conveyed articles, a rail member extending vertically upward at one side of the upper surface, one end of the rail member having an undercut portion defining an extension and the other end of the rail member defining a slot, the slot and extension being complimentarily sized, the slot having a bottom edge above the upper surface of the platform member; and connecting members extending from a bottom surface of the platform member for releasably attaching the platform member to a body member.

6. The surface platform of claim 5, wherein each rail member has a height, and each slot has a height about one-half of the height of the rail member.

7. The surface platform of claim 5, wherein each rail member has a height, and each extension has a height about one-half of the height of the rail member.

8. The surface platform of claim 5, wherein each platform member upper surface has an extending finger and a groove, the fingers and grooves of the platform members being complimentarily sized so that each finger of a platform member on a given link body fits at least partially within the groove of a platform member on an adjacent link body when the given and adjacent link bodies are in the linear condition.

* * * * *